US012711260B2

(12) United States Patent
Nguyen

(10) Patent No.: US 12,711,260 B2
(45) Date of Patent: Aug. 18, 2026

(54) AUTHORIZING AN OPERATION ON SENSITIVE DATA ASSOCIATED WITH A MOBILE DEVICE BY OBTAINING PERMISSION FROM AN AUTHORIZED USER

(71) Applicant: T-Mobile USA, Inc., Bellevue, WA (US)

(72) Inventor: Phi Hoang Nguyen, Lacey, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 183 days.

(21) Appl. No.: 18/638,437

(22) Filed: Apr. 17, 2024

(65) Prior Publication Data

US 2025/0328665 A1 Oct. 23, 2025

(51) Int. Cl.
*G06F 21/62* (2013.01)

(52) U.S. Cl.
CPC ................................ *G06F 21/6218* (2013.01)

(58) Field of Classification Search
CPC ................................................... G06F 21/6218
See application file for complete search history.

(56) References Cited

U.S. PATENT DOCUMENTS 6,304,753 B1 10/2001 Hartmaier
6,952,181 B2 10/2005 Karr et al.
7,203,502 B2 4/2007 Wilson et al.
7,236,799 B2 6/2007 Wilson et al.
7,321,778 B2 1/2008 Ignatius et al.
7,532,899 B2 5/2009 Wilson et al.
7,849,135 B2 12/2010 Agrawal et al.
8,189,548 B2 5/2012 Caldwell et al.
8,189,549 B2 5/2012 Caldwell et al.
8,295,812 B1 10/2012 Jones
8,442,521 B2 5/2013 Fleischman et al.
8,483,710 B2 7/2013 Casey et al.
8,528,056 B2 9/2013 Robbins et al.
8,953,567 B2 2/2015 Annamalai
9,591,560 B2 3/2017 Kotecha
9,825,916 B2 11/2017 Hinton et al.

(Continued)

FOREIGN PATENT DOCUMENTS

CN 106211123 B 6/2019
CN 107258092 B 1/2021

(Continued)

*Primary Examiner* — Jason Chiang
(74) *Attorney, Agent, or Firm* — Perkins Coie LLP

(57) ABSTRACT

The system obtains a request to access data associated with a UE. The request includes an identifier of the first user making the request and an operation to be performed on the data. The system obtains a first role of the first user and a permission of the first role indicating an operation. The system obtains a type of the data and determines whether the type of the data is sensitive data. If not, the system provides the data to the UE; otherwise, the system determines whether the first role is permitted to perform the requested operation on the data. If so, the system performs the operation; otherwise, the system determines a second role permitted to perform the operation. The system determines a second user having the second role and requests an authorization from the second user. Upon receiving the authorization, the system performs the requested operation on the data.

17 Claims, 10 Drawing Sheets

(56) References Cited

U.S. PATENT DOCUMENTS

| | | | | |
|---|---|---|---|---|
| 9,832,676 | B2 | 11/2017 | Ye | |
| 10,032,039 | B1 * | 7/2018 | Milman | G06F 21/6209 |
| 10,084,922 | B2 | 9/2018 | Soini et al. | |
| 10,460,122 | B1 * | 10/2019 | Kirby | H04L 63/101 |
| 11,297,513 | B2 | 4/2022 | Agarwal et al. | |
| 11,463,865 | B1 | 10/2022 | Buscher | |
| 11,689,931 | B2 * | 6/2023 | Rinzler | H04M 1/72463 726/22 |
| 11,886,767 | B2 | 1/2024 | Nguyen | |
| 11,954,238 | B1 * | 4/2024 | Tan | H04L 9/0891 |
| 11,979,422 | B1 * | 5/2024 | Kapoor | G06F 21/554 |
| 12,007,870 | B1 * | 6/2024 | Jain | G06F 11/3438 |
| 2002/0108057 | A1 * | 8/2002 | Zhanhong Wu | H04L 63/08 726/6 |
| 2002/0112153 | A1 * | 8/2002 | Wu | H04L 63/0428 713/153 |
| 2004/0136358 | A1 | 7/2004 | Hind et al. | |
| 2004/0192339 | A1 | 9/2004 | Wilson et al. | |
| 2004/0203902 | A1 | 10/2004 | Wilson et al. | |
| 2005/0143097 | A1 | 6/2005 | Wilson et al. | |
| 2006/0166669 | A1 | 7/2006 | Claussen | |
| 2009/0225075 | A1 * | 9/2009 | Bates | G06T 17/00 345/419 |
| 2009/0300544 | A1 * | 12/2009 | Psenka | H04L 63/10 715/810 |
| 2011/0014923 | A1 | 1/2011 | Krco et al. | |
| 2012/0311672 | A1 * | 12/2012 | Connor | H04L 63/10 726/4 |
| 2013/0117313 | A1 * | 5/2013 | Miao | G06F 21/6245 707/E17.005 |
| 2016/0173432 | A1 * | 6/2016 | Scott-Cowley | H04W 12/08 709/206 |
| 2016/0286041 | A1 * | 9/2016 | Forsman | H04W 12/43 |
| 2017/0104746 | A1 * | 4/2017 | Nair | G06F 21/6218 |
| 2017/0310559 | A1 * | 10/2017 | Jain | H04L 67/60 |
| 2018/0059909 | A1 * | 3/2018 | Kennedy | G06F 16/29 |
| 2020/0028853 | A1 * | 1/2020 | Ford | H04L 63/105 |
| 2020/0301917 | A1 * | 9/2020 | Niu | G06N 5/04 |
| 2021/0019434 | A1 * | 1/2021 | Bibliowicz | G06F 21/6218 |
| 2021/0065267 | A1 * | 3/2021 | Smith | G06Q 20/4014 |
| 2021/0141932 | A1 * | 5/2021 | Barday | G06F 16/125 |
| 2021/0150051 | A1 * | 5/2021 | van't Noordende | H04L 63/18 |
| 2021/0281576 | A1 * | 9/2021 | Shravan | H04L 63/20 |
| 2022/0021516 | A1 * | 1/2022 | Kurian | H04L 9/0894 |
| 2022/0046207 | A1 * | 2/2022 | Kannan | H04N 7/152 |
| 2022/0385740 | A1 * | 12/2022 | Long, III | H04L 67/60 |
| 2023/0075596 | A1 * | 3/2023 | Renu | G06F 9/542 |
| 2023/0164165 | A1 * | 5/2023 | Barth | H04L 63/1433 726/4 |
| 2023/0328522 | A1 | 10/2023 | Shah | |
| 2023/0396623 | A1 * | 12/2023 | Nguyen | H04L 63/108 |
| 2023/0396629 | A1 * | 12/2023 | Vigna | G06F 3/04817 |
| 2024/0064503 | A1 | 2/2024 | Sihotang et al. | |
| 2024/0069752 | A1 * | 2/2024 | Erb | G06F 3/0655 |
| 2024/0176855 | A1 * | 5/2024 | Wadhwa | G06F 21/31 |
| 2024/0241970 | A1 * | 7/2024 | Mendoza | G06F 21/604 |
| 2024/0296244 | A1 * | 9/2024 | Hilliard | G06F 21/6227 |
| 2024/0394377 | A1 * | 11/2024 | Mradul | G06F 21/577 |
| 2025/0117730 | A1 * | 4/2025 | Oberle | G06Q 30/0202 |
| 2025/0119275 | A1 * | 4/2025 | Stockmann | H04L 9/3247 |
| 2025/0139263 | A1 * | 5/2025 | Sne | H04L 63/102 |
| 2025/0141873 | A1 * | 5/2025 | Tao | H04L 63/102 |
| 2025/0217571 | A1 * | 7/2025 | Legatski | G06F 40/30 |
| 2025/0247388 | A1 * | 7/2025 | Osborn | H04L 9/3297 |

FOREIGN PATENT DOCUMENTS

| | | | |
|---|---|---|---|
| CN | 111955028 | B | 2/2022 |
| CN | 112352444 | B | 7/2023 |
| CN | 115004741 | B | 9/2023 |
| DE | 19740560 | B4 | 2/2004 |
| EP | 1129585 | A2 | 9/2001 |
| EP | 1952565 | A1 | 8/2008 |
| EP | 2096830 | B1 | 8/2011 |
| EP | 1518435 | B1 | 2/2012 |
| EP | 2631836 | A1 | 8/2013 |
| EP | 2922013 | B1 | 7/2016 |
| EP | 3272105 | A1 | 1/2018 |
| EP | 3523948 | A1 | 8/2019 |
| EP | 3535953 | A2 | 9/2019 |
| EP | 3728775 | A2 | 10/2020 |
| EP | 3753273 | A1 | 12/2020 |
| EP | 3656108 | B1 | 3/2022 |
| JP | 5993051 | B2 | 8/2016 |
| JP | 6104874 | B2 | 3/2017 |
| JP | 6620144 | B2 | 11/2019 |
| KR | 100621725 | B1 | 9/2006 |
| KR | 100827978 | B1 | 5/2008 |
| KR | 101109558 | B1 | 2/2012 |
| KR | 101167781 | B1 | 7/2012 |
| WO | 2008041942 | A1 | 4/2008 |
| WO | 2010102242 | A2 | 9/2010 |
| WO | 2013062703 | A1 | 5/2013 |
| WO | 2018021922 | A1 | 2/2018 |
| WO | 2018217957 | A1 | 11/2018 |
| WO | 2019191427 | A1 | 10/2019 |
| WO | 2020128455 | A2 | 6/2020 |
| WO | 2020176198 | A1 | 9/2020 |
| WO | 2021247725 | A1 | 12/2021 |

* cited by examiner

500

540

| Actor | Role 510 | Operation 530 | Data type 520 |
|---|---|---|---|
| Account User | User 512 | View 532 | Name 522 |
| | User | View | Payment 524 |
| Account Owner | Owner 514 | Full (view, update) 534 | Address 526 |
| | Owner | Full (view, update) | Account Balance 528 |
| | Owner | Full (view, update) | Call Detail Record 521 |
| Agent | Support 516 | View | Account credit and adjustment 523 |
| | Support | Partial 536 | Account credit and adjustment up to $100 per customer 525 |
| Supervisor | Supervisor 518 | Full | Account credit and adjustment up to $1000 per customer 527 |

*FIG. 5*

AUTHORIZING AN OPERATION ON SENSITIVE DATA ASSOCIATED WITH A MOBILE DEVICE BY OBTAINING PERMISSION FROM AN AUTHORIZED USER

BACKGROUND

For businesses that cater to users with user accounts, a daily challenge arises in determining how to allocate the appropriate permissions to account owners, authorized users, and regular users. The goal is to ensure that users possess the necessary permissions for self-service activities without overstepping the boundaries of their intended authorization. This is crucial to prevent users from inadvertently acting as account owners when they should not be. Moreover, the escalating rate of impersonation through internet hacking poses an additional threat, with anonymous users gaining unauthorized access and potentially posing as account owners.

BRIEF DESCRIPTION OF THE DRAWINGS

Detailed descriptions of implementations of the present invention will be described and explained through the use of the accompanying drawings.

FIG. 5 shows roles, data types, operations, and permissions that enable the system to perform authorizations.

Figure 1:
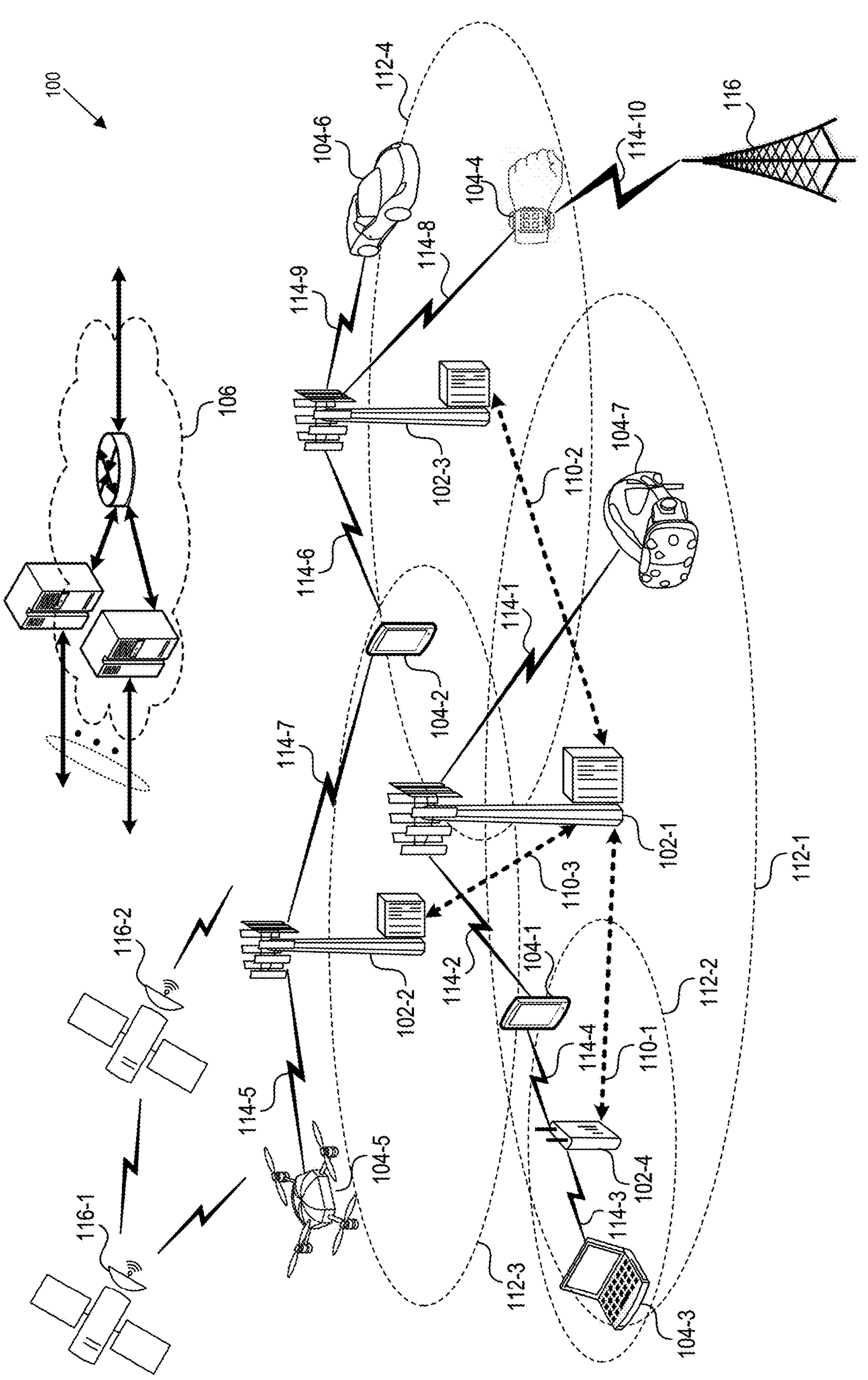
FIG. 1 is a block diagram that illustrates a wireless telecommunication network ("network") in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed methods are essential to strike a balance between a system that promotes nuanced authorization and ensures a granular level of access control rather than a one-size-fits-all approach. The system strikes a balance between security and user convenience. In addition, the system grants agents specific permissions to view user accounts, and users can authorize agents to make account modifications on their behalf. The system enables seeking appropriate permissions, especially at the supervisor level for high-value transactions or adjustments.

The system provides timely security authentication and authorization. The system leverages advanced tools, from GenAI to real-time push notifications on smart devices, to enable swift approval processes. This ensures that proper approvals from the right account owners are obtained within minutes, if not seconds, while users are waiting online. This not only enhances security but also contributes to a seamless and efficient user experience.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a user premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
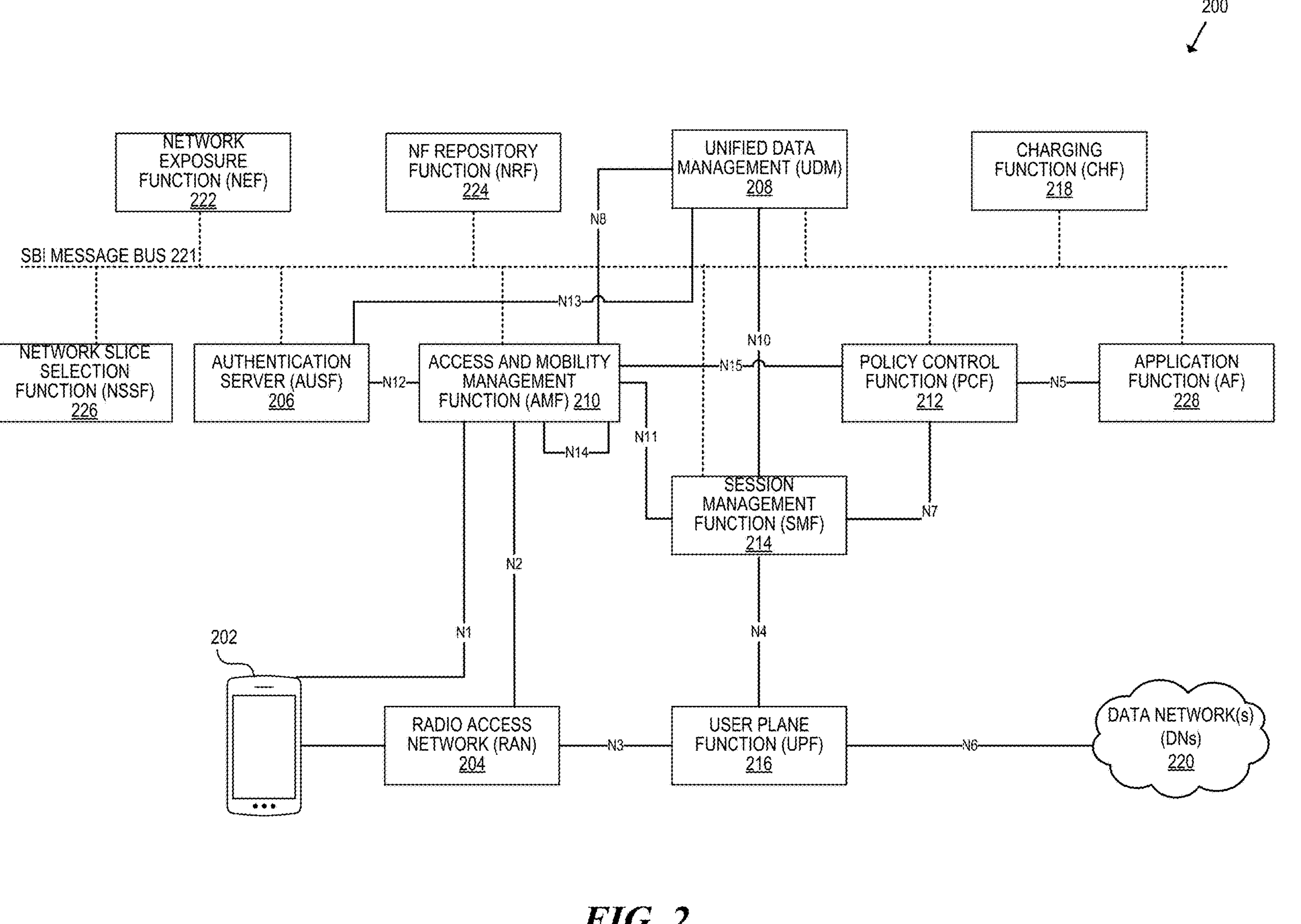
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFS include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
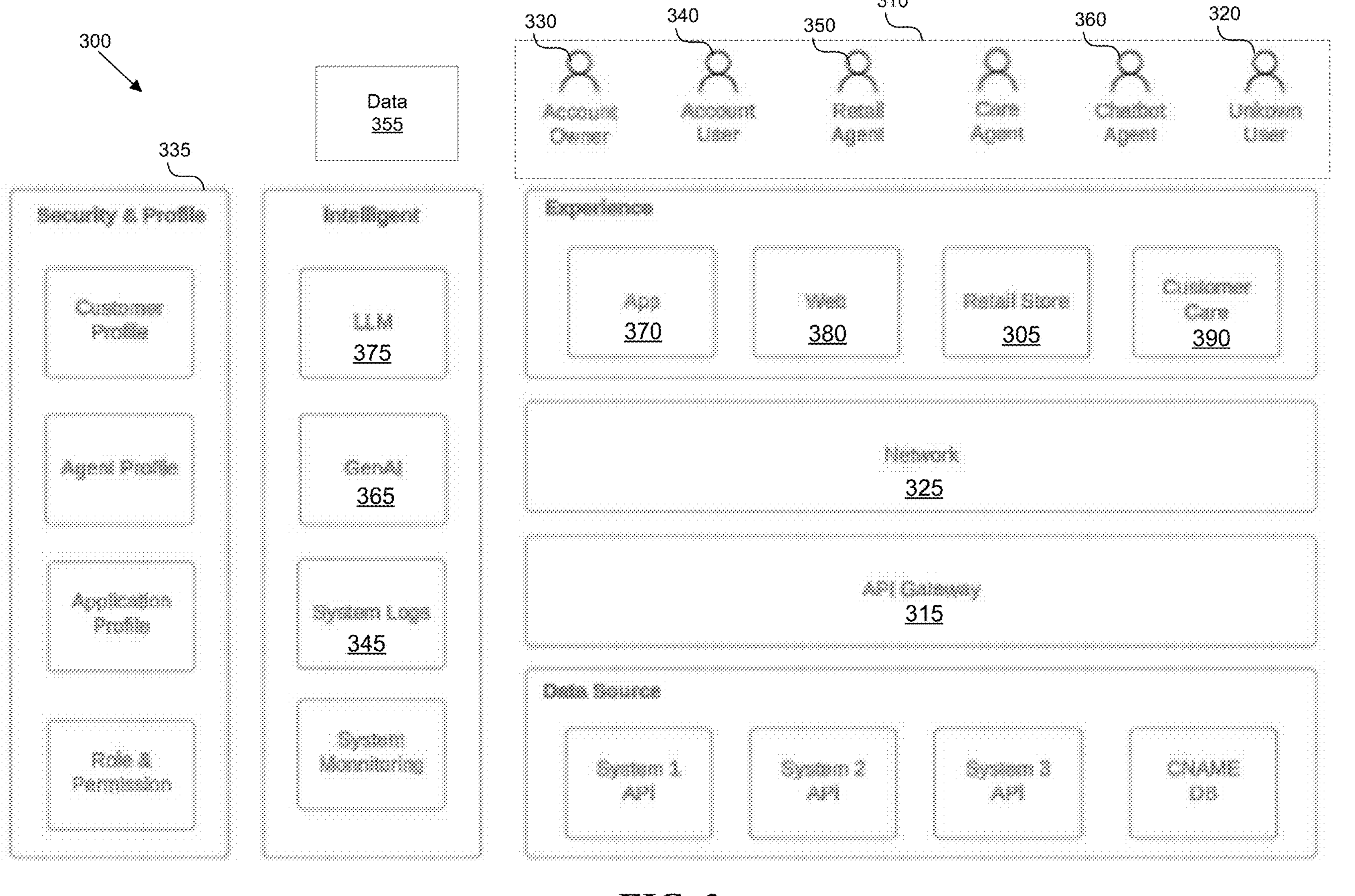
FIG. 3 shows a high-level architecture encompassing various components within the system.

Authorizing an Operation on Sensitive Data Associated with a Mobile Device by Obtaining Permission from an Authorized User FIG. 3 shows a high-level architecture encompassing various components within the system. The system 300 can include user roles 310, which can be hierarchical, from a role with the lowest access to a role with the highest access. Regardless of the role 310 accessing the system 300, the system can recognize the role 310 and provide the role with appropriate permissions to access the relevant information. The concept of an unknown or anonymous user or role 320 introduces the risk of impersonation, attempting to assume roles not associated with the user account. If an impersonator gains access to the system 300 through an exposed user account, their access is limited to that specific user's permissions, not the entire account.

Permission escalation is structured hierarchically to reach higher user roles, alerting the account owner and empowering them to take action against the anonymous user. For example, the account owner 330 can have higher permissions than the account user 340, while retail agent 350 can have higher permissions than chat bot agent 360.

Users can enter the ecosystem through various means, such as a mobile application 370, website 380, user care call 390, or in-person retail 305 interaction. Regardless of the entry point, robust authentication is crucial to validate the user before granting access to the system 300. Even when an agent serves a user, whether over the phone or face-to-face, the agent's role alone should not permit access or changes to user data 355 without explicit user agreement and authorization. This stringent protection ensures that user data 355 remains safeguarded, only accessible to authorized individuals.

The system 300 can identify the user's role 320, 330, 340, 350, 360 and protect user data 355 at every layer of the data's journey. The application programmer interface (API) layer 315 verifies the user's role 320, 330, 340, 350, 360 before transmitting user data 355, and the network 325 authenticates the user as the request traverses through. Network 325 can be part of the network 100 in FIG. 1.

For example, when a mobile phone contacts user care or accesses data 355 via a mobile application 370 through the network 325, the network validates mobile information, location, and authentication before passing it to the next layer 315. If any of these checks fail, the network 325 rejects the data request.

Leveraging data from various profiling sources 335 and system logs 345, Large Language Model (LLM) 375 and Generative AI (GenAI) 365 play crucial roles in categorizing, detecting, and accessing patterns and predicting whether the current data request should be granted or denied, further fortifying the security measures in place.

Figure 4:
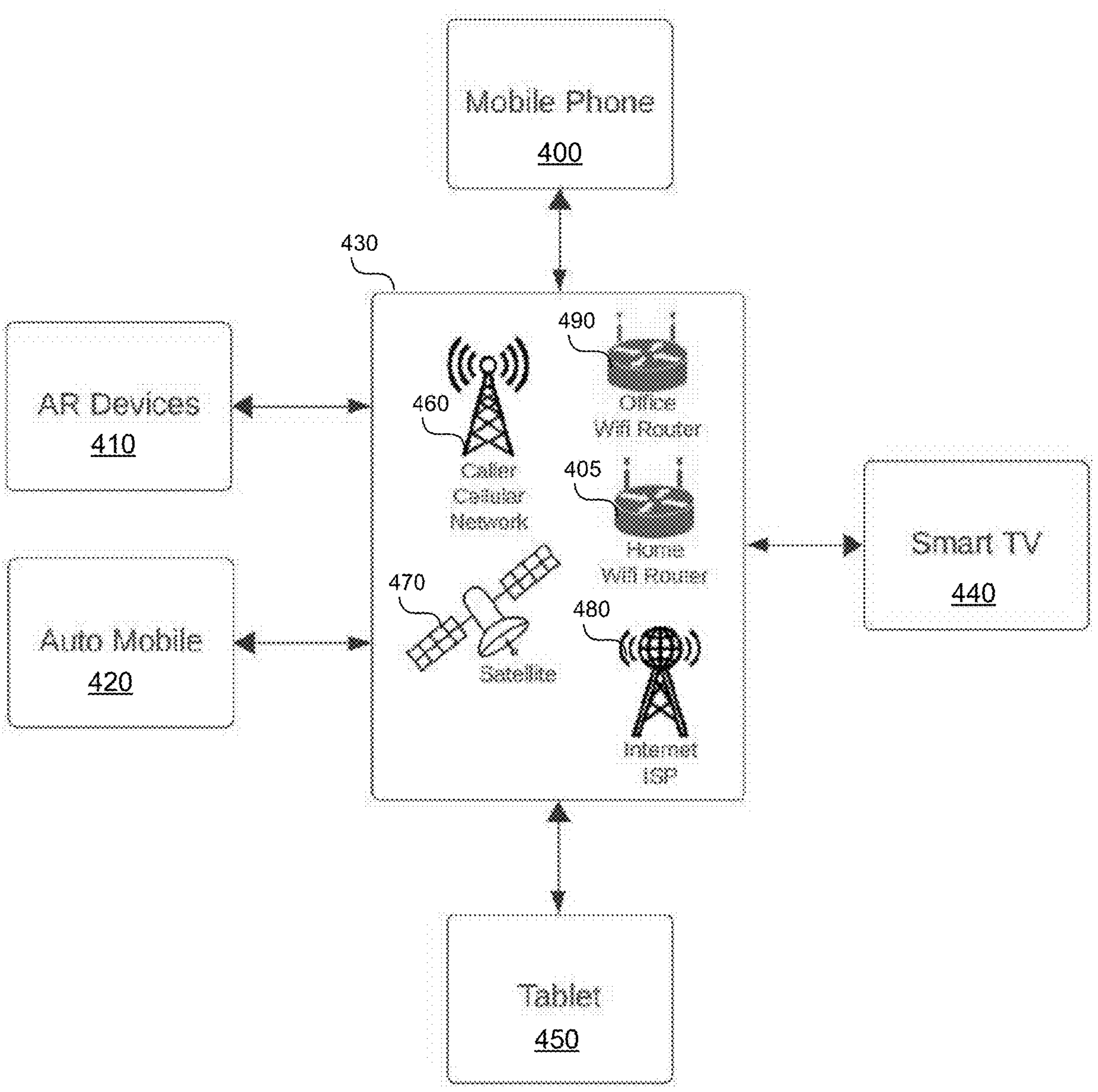
FIG. 4 shows the diverse avenues through which a user can access account information using various personal devices.

FIG. 4 shows the diverse avenues through which a user can access account information using various personal devices. The personal devices, e.g., UEs, can include a mobile phone 400, augmented reality (AR)/virtual reality (VR) device 410, a vehicle 420 with cellular access connected to the network 430, a television (TV) 440 connected to the network 430, and/or a tablet 450. Each device 400, 410, 440, 450 can connect to the network 430, and the method can vary depending on the device and the user's location. Network 430 can be part of the network 100 in FIG. 1.

Voice calls, for instance, require internet access, which can be facilitated through multiple channels such as mobile networks 460, satellite connections 470, or Internet Service Providers (ISPs) 480. The choice of network depends on the user's location and the available infrastructure.

Users typically rely on mobile networks 460 or satellite connections 470 when accessing data outside the home environment. In contrast, within the confines of home or office spaces, users access data through the internet router for 490, 405 and gateway, extending to the ISP 480. These network providers play a pivotal role in enabling us to deliver account authorization requests precisely when and where they are needed. The effectiveness of these providers is crucial in ensuring timely responses, preventing users from enduring prolonged wait times, whether online or over the phone. The seamless integration of these network pathways is fundamental to the overall user experience, providing accessibility to account information without unnecessary delays or disruptions.

FIG. 5 shows roles, data types, operations, and permissions that enable the system to perform authorizations. The table 500, stored in memory, can represent roles 510, data type 520, and operations 530 that can be performed on the data types 520. Together, the data type 520 and the operation 530 can form a permission 540.

The data types 520 can include name 522, payment 524, address 526, account balance 528, call detail record 521, account credit and adjustment 523, account credit and adjustment up to $100 per user 525, and account credit and adjustment up to $1000 per user 527.

The operations 530 can include view 532, full 534, and partial 536. The full operation 534 can include viewing and/or updating the corresponding data type.

The roles 510 can include user roles such as user 512 and owner 514. The user 512 can view various data types such as name 522 and payment 524. The owner 514 can view and update various data types such as name 522, payment 524, address 526, account balance 528, and/or call detail record 521.

The roles 510 can include agent roles such as support 516 and supervisor 518. The support 516 can view account credit and adjustment 523 and can adjust account credit up to $100 per user. The supervisor 518 can perform the same functions as the support 516 and, in addition, can adjust account credit after $100 per user.

The roles 510 can be hierarchical. For example, on the user side, the role 512 can be lower in the hierarchy than the role 514 because the role 514 includes all the permissions of the role 512 as well as additional permissions. Similarly, on the agent side, the role 516 can be lower in the hierarchy than the role 518.

The disclosed system can distinguish the role of the user attempting to access user account data and determine whether the user possesses the requisite permissions 540 for such access.

In scenarios where a user lacks the necessary permissions and access to certain data is sought, the system dynamically identifies which user role holds the required permissions. For example, if the user having the role of user 512 attempts to view the account balance, the system can determine the next role in the hierarchy that can view the account balance. Consequently, the system can send a request to the user that can view the account balance to solicit an authorization for the requesting user to access the account balance. This nuanced approach ensures that data access is governed by explicit permissions, promoting security and accountability.

The system can employ similar permissions for agents of the network 100 in FIG. 1. For example, if the agent of the network does not have access to a user's data, the system can only grant access when the user, with the appropriate permissions, explicitly approves such access. This heightened focus on security recognizes the evolving landscape, where trust is not implicit and security breaches may originate from both internal and external sources. The full visibility into user and agent profiles, along with the specific type of data being accessed, is paramount. This visibility serves as a critical component in providing precise access controls, safeguarding customers in every conceivable scenario.

Figure 6:
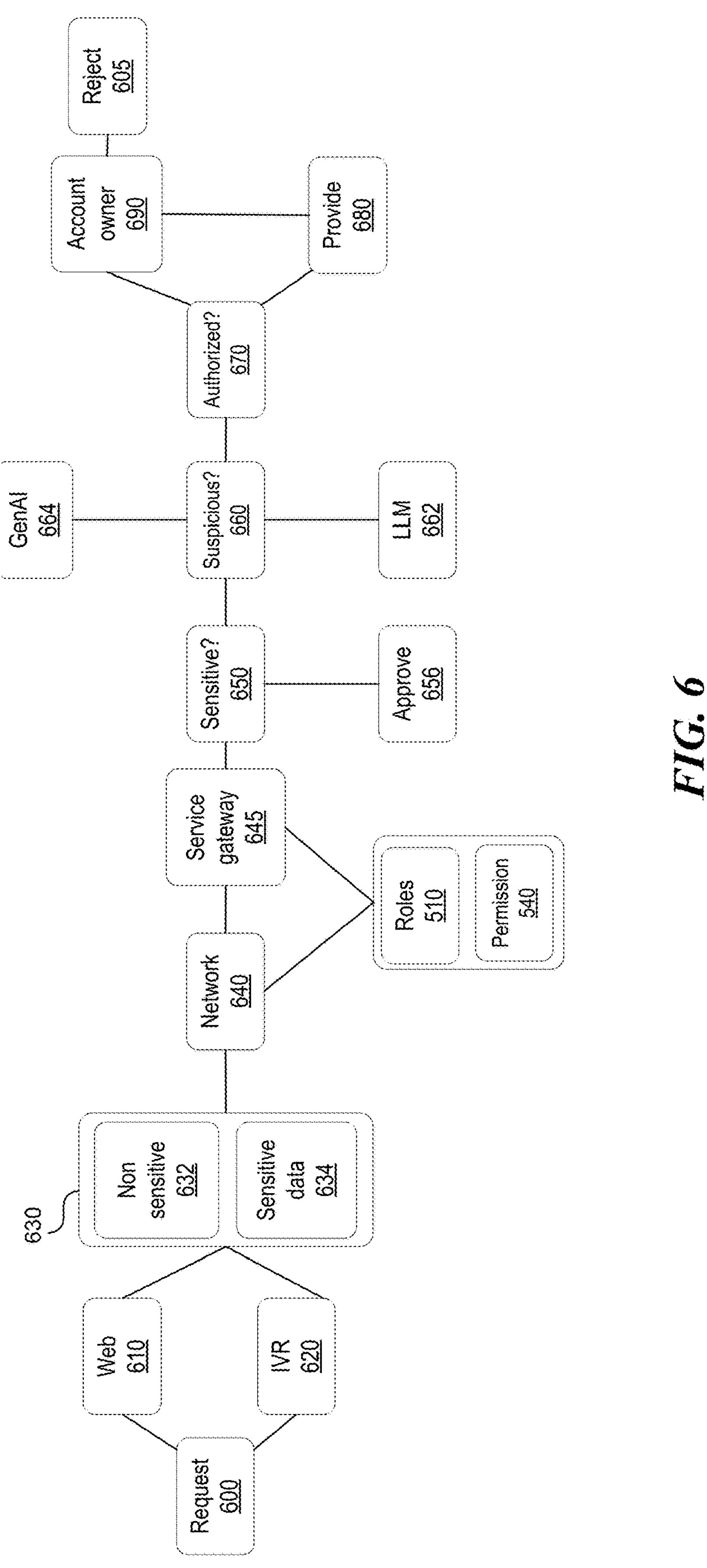
FIG. 6 illustrates the process steps when a user tries to access data associated with the network.

FIG. 6 illustrates the process steps when a user tries to access data associated with the network. The system can receive a request 600 from a UE operating on the network 100 in FIG. 1 through a web application 610 or interactive voice response 620. The request 600 can indicate the type 630 of requested data, such as non-sensitive data 632, e.g., public data, or sensitive data 634.

The network 640 and the service gateway 645 can obtain user roles 510 and permissions 540. The role 510 becomes pivotal in subsequent steps when the user accesses account data, particularly pertaining to personal and billing-related information. Network 640 and/or the service gateway 645 can be part of the network 100 in FIG. 1.

In step 650, the system can determine whether the request 600 asks to access non-sensitive data 632 or sensitive data 634. For non-sensitive data, such as store locations and operating hours, there is no need to validate the customer role extensively, and in step 656, the system can provide non-sensitive data based on the request 600. Conversely, for sensitive data, such as a billing address, the system rigorously verifies the customer's role to ensure authorized access. As highlighted in FIG. 5, customer roles and permissions are preconfigured in the customer profile database, guiding the permission process.

The validation of allowed or not allowed permissions occurs at every network hop, starting from the network 640 element itself, detecting the user's mobile number and profile after authentication. At the service or API gateway 645 level, where all system APIs for headless data access are hosted, the API gateway evaluates the request's validity based on direct integration with the profile database, request data, and request headers (including the user's role). It can approve, reject, or request additional permissions before passing the request to the next application step. To ensure comprehensive security, security measures are implemented at every network hop, preventing unauthorized access by users or systems attempting to bypass authentication. This multi-layered approach safeguards against any attempt to intrude into the ecosystem to retrieve customer data without proper authentication and profile role.

In step 660, the system can determine whether the request 600 is suspicious. When handling requests for sensitive data, an added layer of caution is essential before releasing such information. An effective way to ensure the legitimacy of a data request is by analyzing the user's recent mobile usage patterns.

For example, if the subscriber's mobile device was in use a few minutes ago at a specific location and then, within a short timeframe, appears at a different location that is geographically distant and implausible to reach within that window, it raises concerns about the request's legitimacy. In such cases, a proactive approach is to withhold the release of sensitive data until the account owner explicitly approves the request. Leveraging the capabilities of LLM 662 and GenAI 664, we can employ intelligent analysis. By feeding these systems with data encompassing customer usage patterns, current and last-known locations, and the specific type of data the user is requesting, the system can discern whether the request conforms to a typical and expected pattern or if it exhibits suspicious characteristics. This advanced analysis allows us to make informed decisions about the legitimacy of data requests, providing an additional layer of security by flagging and scrutinizing patterns that deviate from the norm. As hacking techniques become increasingly sophisticated, this cautious and intelligent approach becomes crucial in safeguarding sensitive customer information from unauthorized access and potential security threats.

In a more specific example, the system can obtain the location associated with the UE sending the request 600. If 10 minutes earlier, the system received a previous request from Seattle and the current request 600 is received from Los Angeles, the system can determine that the request is suspicious.

If the system determines that the activity is suspicious, the system can tag the request 600 and proceed to step 670. If the system determines that the request is not suspicious, the system can proceed to step 670 without tagging the request 600.

In step 670, the system can determine whether the role 510 associated with the user sending the request 600 has the authorization to access the requested data. The level of authorization depends on the type of data and the type of operation requested. The more sensitive the data and the more sensitive the operation, such as modifying as opposed to viewing, the higher level of authorization is needed. If role 510 associated with the user has the authorization to access the requested data and the request 600 has not been tagged as suspicious, the system can proceed to provide the data in step 680.

If the role 510 associated with the user has the authorization to access the requested data and the request 600 has been tagged as suspicious, the flow is the same as if the role 510 does not have access to the requested data. In both cases, the system reaches out to the next role 690 in the hierarchy, such as the account owner role, that has authorization to access the requested data to request temporary access on behalf of the user. If the account owner recognizes and approves the access, the user gains visibility into the requested data in step 680. Conversely, if the account owner does not recognize the user, the request is rejected in step 605 and current access may be revoked.

The temporary access granted by a different user can be valid for a predetermined period of time, such as 30 minutes. Within those 30 minutes, the user sending the request 600 can repeatedly perform the request 600. After the predetermined period of time, the system revokes the temporary access.

Mirroring the customer data access process in FIG. 6, agents undergo a similar protocol where the system detects and grants permission based on role, permissions, and the type of data associated with the agent before releasing the requested information. The system implements two distinct scenarios.

First, when a customer seeks assistance, an agent, utilizing either the same application as the user or an internal application exclusive to agents, attempts to access company data. The agent does not have default access to customer data. The system recognizes the request as coming from an agent (based on the provided role) and checks the current customer role. If the customer has access to the requested data, the system seeks access approval from the customer. Upon approval, the agent gains visibility. If denied, the system requests access from the account owner, who either approves, rejects, or warns the agent about the unfamiliar user. This security measure prevents scenarios like ransomware attacks where an anonymous user attempts to take over a customer account during live agent interactions.

Second, in situations where no customer is on the line, agents may need to access customer data for offline research and issue resolution. Given that agents lack direct access to customer data, the system reaches out to the account owner to request access for these tasks. If the account owner recognizes and approves the request, the agent can proceed. Otherwise, the agent should refrain from performing this work on behalf of the customer. This scenario acts as a protective barrier against potential hacking attempts originating within the company, fortifying the security of customer data.

Similar to the user workflow, the system can determine whether the request coming from the agent is suspicious, in step 660, based on location of the agent, the type of data requested, and previous requests received from the agent.

Figure 7:
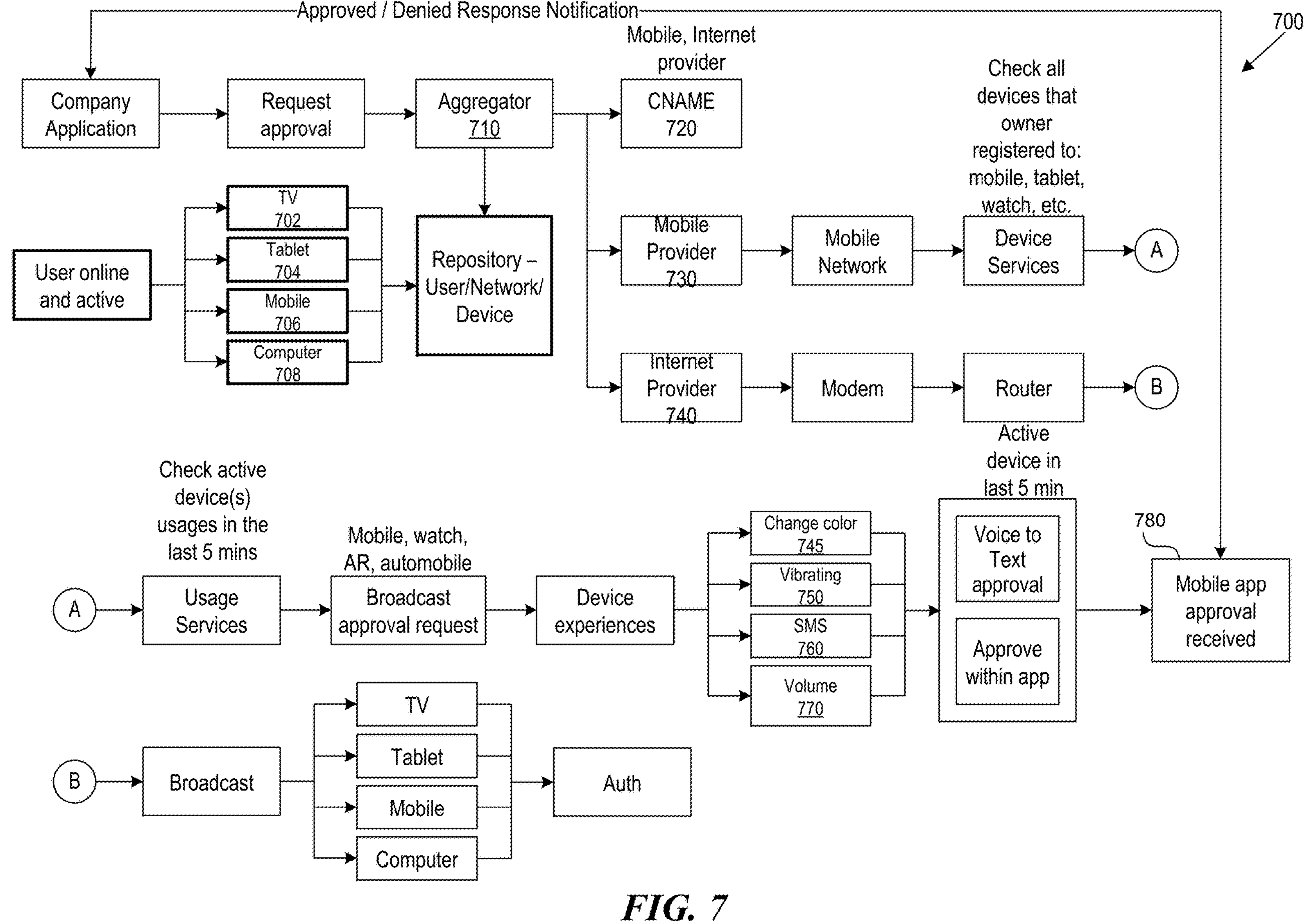
FIG. 7 shows a system to request authorization from a second user.

FIG. 7 shows a system to request authorization from a second user. The system 700 serves as a pivotal enabler, facilitating real-time data access approval for both online customers and agents, regardless of the devices the account owner currently has access to. This mechanism is designed to enhance security by allowing immediate approval or denial of data access requests.

The typical scenario involves an account owner actively using a UE, making approval straightforward. However, challenges arise when the account owner is engaged in various activities like browsing on a TV or tablet, driving, or multitasking, necessitating an innovative solution to promptly notify and seek approval or rejection.

The disclosed system 700 enables two paths: first, device-specific intelligent notification, and second, broadcast notification. In device-specific intelligent notification, the system 700 utilizes full intelligence to determine the currently active device with the account owner's attention. The notification is then directed solely to that device, avoiding unnecessary notifications to other associated devices. This represents a best possible forward-looking solution to notify the right owner and device. In broadcast notification, the system 700 broadcasts notifications to all devices currently attached to the network associated with the account owner. While potentially inconvenient for the user, as multiple devices may receive notifications, it ensures that the critical account security request receives immediate attention.

As outlined in FIG. 4, the user's devices can be connected to different networks. To manage this, an aggregator 710 gathers information about all the UEs 702, 704, 706, 708 associated with the user from the various providers such as caller name (CNAM) database 720 associated with the network 100, second telecommunication network 730, and Internet service provider 740. In the second use case, to broadcast to all the UEs 702, 704, 706, 708, the system 700 can send a notification, regardless of whether the UE is active or not.

In the first use case, the system 700 can determine the active UEs among all the UEs 702, 704, 706, 708 and send the notification only to the active UEs. Alternatively, the system 700 can notify only the UEs on which the second user, who needs to grant the authorization, is active.

To obtain active UEs from the Internet service provider 740, in-home Wi-Fi routers play a crucial role in recognizing active UEs on the home network and directing notifications to the appropriate user device on which the second user is active, based on device type, usage patterns, and user profiles. To obtain active UEs from the network 100, 730, network tower triangulation, location tracking, and real-time usage history enable networks 100, 730 to push notifications directly to the active device.

The system 700 can send the notifications in various forms, including changing colors 745 of the UE, vibrating 750 the UE, sending a text message 760 to the UE, and adjusting the volume 770 of the UE by lowering music volume and increasing volume of the notification provided through the audio associated with the UE. Additionally, the system 700 can project a notification on a windshield of the UE if the UE is a vehicle.

In one embodiment, the notification only notifies the second user of the request for the approval; however, the user in step 780 needs to go to a designated device, such as the mobile phone, to provide the approval. For example, the second user can receive the notification on a TV screen; however, the second user has to log on to a mobile device associated with the second user in the CNAM database 720 to grant the approval. In another embodiment, the second user can receive the notification and grant the approval on the same device.

Figure 8A:
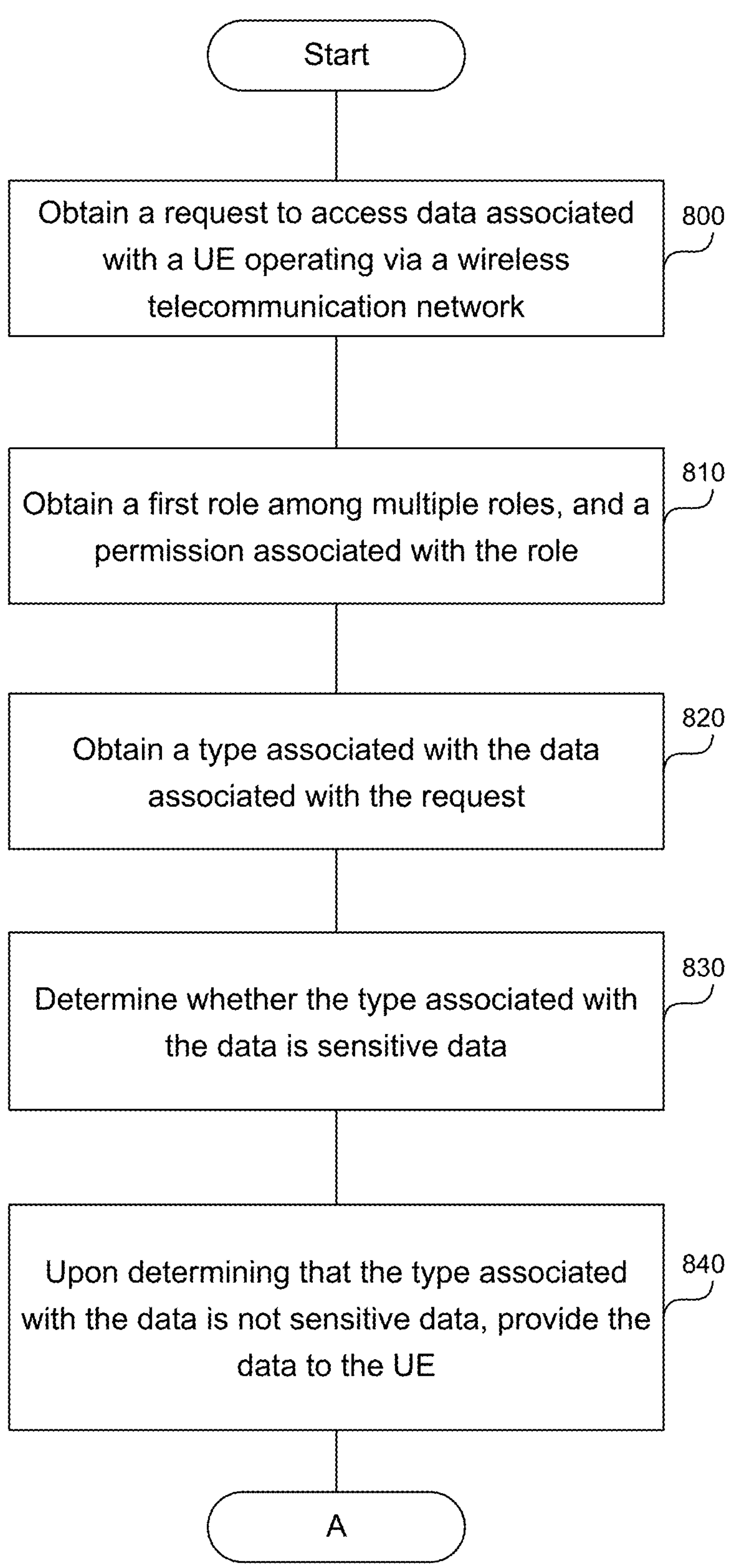
FIGS. 8A-8B are a flowchart of a method to authorize an operation on sensitive data associated with a mobile device by obtaining permission from an authorized user.
Figure 8B:
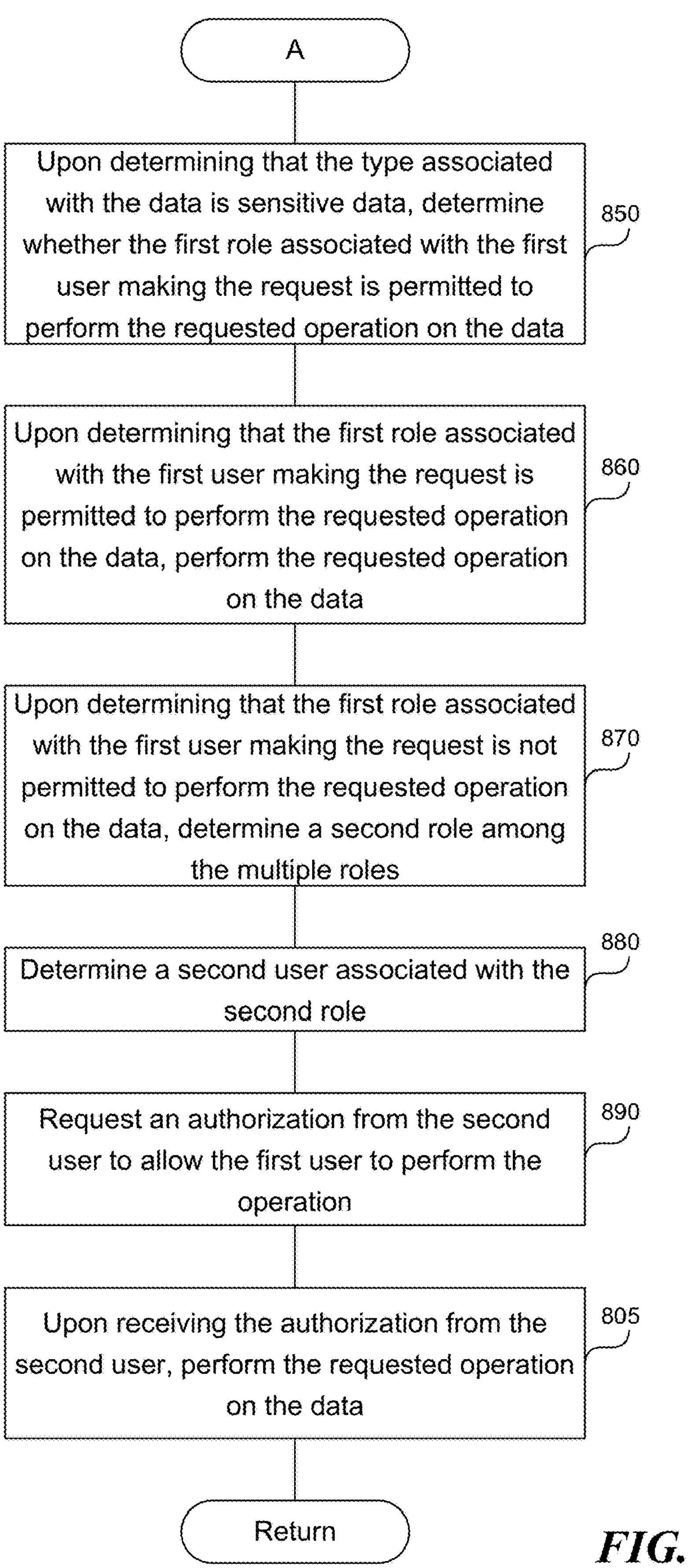

FIGS. 8A-8B are a flowchart of a method to authorize an operation on sensitive data associated with a mobile device by obtaining permission from an authorized user. A hardware or software processor executing instructions describing this application can, in step 800, obtain a request to access data associated with a UE operating via a wireless telecommunication network, where the request includes an identifier associated with the first user making the request and an operation to be performed on the data.

In step 810, the processor can obtain a first role among multiple roles and a permission associated with the role, where the first role is associated with the first user making the request and where the permission indicates an operation and a data type on which the operation can be performed.

In step 820, the processor can obtain a type associated with the data associated with the request, where the type associated with the data includes sensitive data or non-sensitive data.

In step 830, the processor can determine whether the type associated with the data is sensitive data. In step 840, upon determining that the type associated with the data is not sensitive data, the processor can provide the data to the UE.

In step 850, upon determining that the type associated with the data is sensitive data, the processor can determine whether the first role associated with the first user making the request is permitted to perform the requested operation on the data.

In step 860, upon determining that the first role associated with the first user making the request is permitted to perform the requested operation on the data, the processor can perform the requested operation on the data.

In step 870, upon determining that the first role associated with the first user making the request is not permitted to perform the requested operation on the data, the processor can determine a second role among the multiple roles, where the second role is permitted to perform the requested operation on the data.

In step 880, the processor can determine a second user associated with the second role. In step 890, the processor can request an authorization from the second user to allow the first user to perform the operation.

In step 805, upon receiving the authorization from the second user, the processor can perform the requested operation on the data. If the processor does not receive authorization, the processor can decline to perform the requested operation.

The processor can detect suspicious activity. The processor can determine whether the request is suspicious based on geographic location. Specifically, the processor can determine a geographic location associated with the request. The processor can obtain a second received request associated with the UE. The processor can determine a second geographic location associated with the second received request associated with the UE. The processor can determine a time difference between a receipt of the request and a receipt of the second received request. The processor can determine that the request is suspicious by determining that distance between the geographic location and the second geographic location cannot be traversed within the time difference. Even upon determining that the first role associated with the first user making the request is permitted to perform the requested operation on the data but upon determining that the request is suspicious, the processor can send a second request to a second UE associated with the first user making the request. The second request can ask the first user making the request to authorize the requested operation on the data.

In one embodiment, the agent can request to access user data. The processor can receive the request to access the data associated with the UE operating via the wireless telecommunication network, where the request comes from an agent associated with the wireless telecommunication network. The agent can be a person or an artificial intelligence. The processor can obtain the first role among multiple roles. The first role can indicate that the agent is making the request, and the permission can indicate that the agent is not authorized to perform the requested operation on the data. Upon determining that the first role associated with the first user making the request is not permitted to perform the requested operation on the data, the processor can determine the second role among the multiple roles, where the second role is a second user, such as an account owner. The processor can request authorization from the second user to enable the agent to perform the operation, thereby preventing a ransomware attack by an anonymous user attempting to take over the user account during the communication.

The processor can determine whether there is a vicious activity from the agent. The processor can receive the request to access the data associated with the UE operating via the wireless telecommunication network, where the request comes from an agent, e.g., a person or an AI, associated with the wireless telecommunication network. The processor can obtain the first role among multiple roles, where the first role indicates that the agent is making the request and where the permission indicates that the agent is authorized to perform the requested operation on the data. The processor can determine whether the request is suspicious based on the geographic location. Specifically, the processor can determine a geographic location associated with the request. The processor can obtain a second received request associated with the UE. The processor can determine a second geographic location associated with the second received request associated with the UE. The processor can determine a time difference between a receipt of the request and a receipt of the second received request. The processor can determine that the request is suspicious by determining that distance between the geographic location and the second geographic location cannot be traversed within the time difference. Even upon determining that the first role associated with the first user making the request is permitted to perform the requested operation on the data but upon determining that the request is suspicious, the processor can send a second request to a second UE associated with the first user making the request, where the second request asks the first user making the request to authorize the requested operation on the data.

The processor can obtain, from the wireless telecommunication network, an indication of a first multiplicity of UEs associated with the second user and operating via the wireless telecommunication network. The processor can obtain, from the second wireless telecommunication network, an indication of a second UE associated with the second user operating via the second wireless telecommunication network. The processor can obtain, from an Internet service provider, an indication of a UE associated with the second user and operating via the Internet service provider. The processor can obtain, from the wireless telecommunication network, a first indication of a first UE among the first multiplicity of UEs, where the first UE is currently active via the wireless telecommunication network and where the indication includes an identifier associated with the first UE or an indication that there are no UEs currently active via the wireless telecommunication network. The processor can obtain, from the second wireless telecommunication network, a second indication of a UE currently active via the second wireless telecommunication network, where the indication includes an identifier associated with the UE currently active via the second wireless telecommunication network or an indication that there are no UEs currently active via the second wireless telecommunication network. The processor can obtain, from the Internet service provider, a third indication of a UE currently active via the Internet service provider, where the indication includes an identifier associated with the UE currently active via the Internet service provider or an indication that there are no UEs currently active via the Internet service provider. The processor can request the authorization from the second user by sending a request for authorization to the first UE currently active via the wireless telecommunication network, the UE currently active via the second wireless telecommunication network, and/or the UE currently active via the Internet service provider. The processor can send a notification to a UE on which the second user is logged in. In addition, the processor can broadcast the notification to all the UEs associated with the user regardless of which UE is active.

The processor can obtain, from the wireless telecommunication network, an indication of a first multiplicity of UEs associated with the second user and operating via the wireless telecommunication network. The processor can obtain, from the second wireless telecommunication network, an indication of a second UE associated with the second user operating via the second wireless telecommunication network. The processor can obtain, from an Internet service provider, an indication of a UE associated with the second user and operating via the Internet service provider. The processor can obtain, from the wireless telecommunication network, a first indication of a first UE among the first multiplicity of UEs, where the first UE is currently active via the wireless telecommunication network and where the indication includes an identifier associated with the first UE or an indication that there are no UEs currently active via the wireless telecommunication network. The processor can obtain, from the second wireless telecommunication network, a second indication of a UE currently active via the second wireless telecommunication network, where the indication includes an identifier associated with the UE currently active via the second wireless telecommunication network or an indication that there are no UEs currently active via the second wireless telecommunication network. The processor can obtain, from the Internet service provider, a third indication of a UE currently active via the Internet service provider, where the indication includes an identifier associated with the UE currently active via the Internet service provider or an indication that there are no UEs currently active via the Internet service provider. Based on the first indication, the second indication, and the third indication, the processor can determine whether there is a currently active UE. Upon determining that there is the currently active UE, the processor can request the authorization from the second user by sending a request for authorization to the first UE currently active via the wireless telecommunication network, the UE currently active via the second wireless telecommunication network, or the UE currently active via the Internet service provider. Upon determining that there is no currently active UE, the processor can send the request for authorization to the first multiplicity of UEs, the second UE, and the UE.

Upon receiving the authorization from the second user, the processor can receive a second request to access data associated with the UE operating via the wireless telecommunication network, where the request includes the identifier associated with the first user making the request and the operation to be performed on the data. The processor can determine whether the request is suspicious, as described in this application. Upon determining that the request is not suspicious, the processor can determine whether the second request is received within a predetermined amount of time, such as 30 minutes, from the request. Upon determining that the request is not suspicious and that the second request is received within the predetermined amount of time from the request, the processor can authorize the second request. Upon determining that the request is suspicious, the processor can request the authorization from the second user.

Computer System

Figure 9:
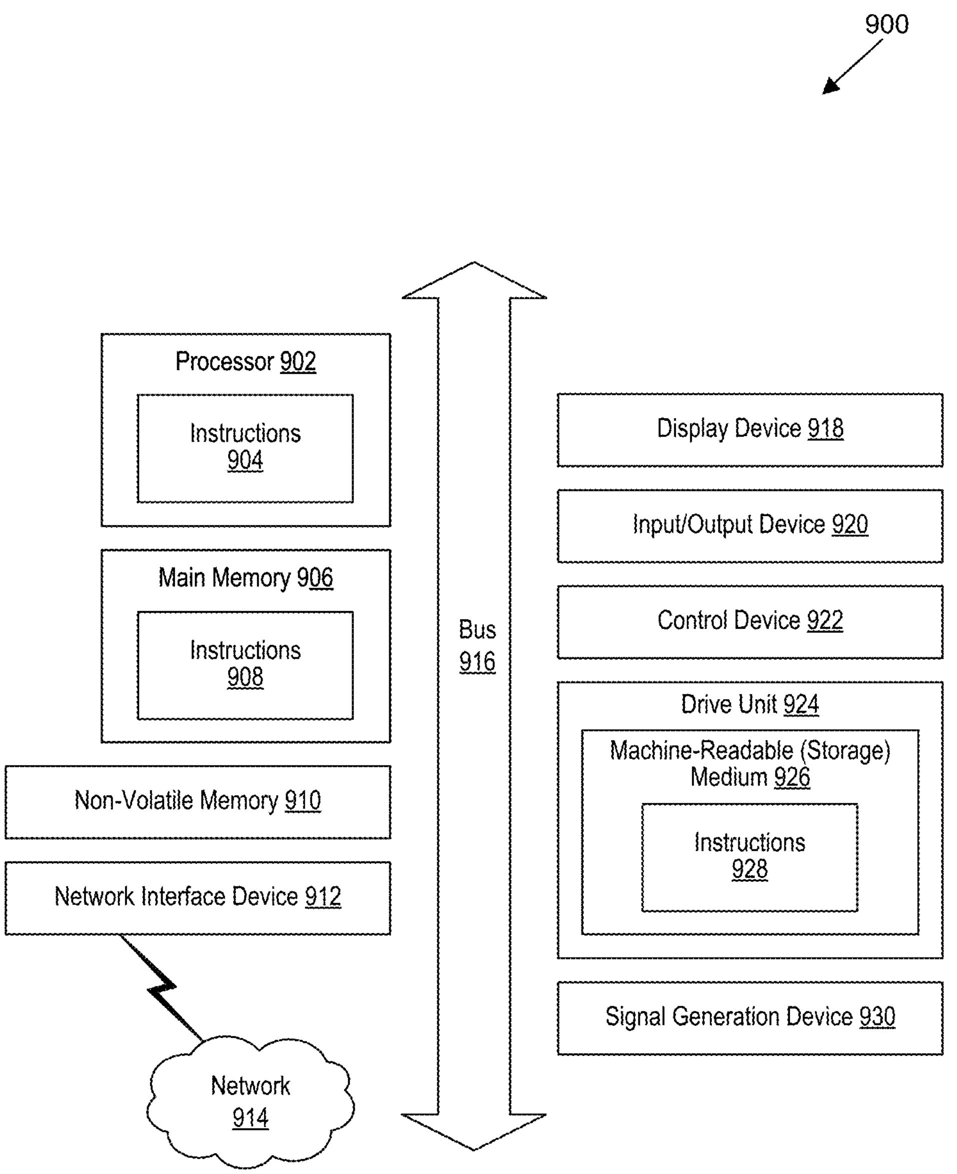
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the Figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementations, the computer system 900 can be an embedded computer system, a system-on-chip (SOC), a single-board computer system (SBC), or a distributed system such as a mesh of computer systems, or it can include one or more cloud components in one or more networks. Where appropriate, one or more computer systems 900 can perform operations in real time, in near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon, wherein the instructions, when executed by at least one data processor of a system, cause the system to:

obtain a request to access data associated with a mobile device operating via a 5G wireless telecommunication network, wherein the request includes an identifier associated with a first user making the request and a requested operation to be performed on the data;

obtain a first role among multiple roles, and a permission associated with the first role, wherein the first role is associated with the first user making the request, and wherein the permission indicates an operation and a data type on which the operation can be performed;

obtain a type associated with the data associated with the request, wherein the type associated with the data includes sensitive data;

determine whether the type associated with the data is sensitive data;

upon determining that the type associated with the data is not sensitive data, provide the data to the mobile device;

upon determining that the type associated with the data is sensitive data, determine whether the first role associated with the first user making the request is permitted to perform the requested operation on the data;

upon determining that the first role associated with the first user making the request is permitted to perform the requested operation on the data, perform the requested operation on the data;

upon determining that the first role associated with the first user making the request is not permitted to perform the requested operation on the data, determine a second role among the multiple roles, wherein the second role is permitted to perform the requested operation on the data;

determine a second user associated with the second role;

request an authorization from the second user to allow the first user to perform the operation;

upon receiving the authorization from the second user, perform the requested operation on the data;

obtain, from the 5G wireless telecommunication network, an indication of a first multiplicity of mobile devices associated with the second user and operating via the 5G wireless telecommunication network;

obtain, from a second 5G wireless telecommunication network, an indication of a second mobile device associated with the second user operating via the second 5G wireless telecommunication network;

obtain, from an Internet service provider, an indication of a device associated with the second user and operating via the Internet service provider;

obtain, from the 5G wireless telecommunication network, a first indication of a first mobile device among the first multiplicity of mobile devices, wherein the first mobile device is currently active via the 5G wireless telecommunication network, and wherein the indication includes an identifier associated with the first mobile device or an indication that there are no devices currently active via the 5G wireless telecommunication network;

obtain, from the second 5G wireless telecommunication network, a second indication of a mobile device currently active via the second 5G wireless telecommunication network, wherein the indication includes an identifier associated with the mobile device currently active via the second 5G wireless telecommunication network or an indication that there are no devices currently active via the second 5G wireless telecommunication network;

obtain, from the Internet service provider, a third indication of a device currently active via the Internet service provider, wherein the indication includes an identifier associated with the mobile device currently active via the Internet service provider or an indication that there are no devices currently active via the Internet service provider;

based on the first indication, the second indication, and the third indication, determine whether there is a currently active device;

upon determining that there is the currently active device, request the authorization from the second user by sending a request for authorization to the first mobile device currently active via the 5G wireless telecommunication network, the mobile device currently active via the second 5G wireless telecommunication network, or the device currently active via the Internet service provider; and upon determining that there is no currently active device, send the request for authorization to the first multiplicity of mobile devices, the second mobile device, and the device.

2. The non-transitory, computer-readable storage medium of claim 1, comprising instructions to:

determine whether the request is suspicious by:

determining a geographic location associated with the request;

obtaining a second received request associated with the mobile device;

determining a second geographic location associated with the second received request associated with the mobile device;

determining a time difference between a receipt of the request and a receipt of the second received request; and determining that the request is suspicious by determining that distance between the geographic location and the second geographic location cannot be traversed within the time difference; and even upon determining that the first role associated with the first user making the request is permitted to perform the requested operation on the data but upon determining that the request is suspicious, send a second request to a second mobile device associated with the first user making the request, wherein the second request asks the first user making the request to authorize the requested operation on the data.

3. The non-transitory, computer-readable storage medium of claim 1, comprising instructions to:

receive the request to access the data associated with the mobile device operating via the 5G wireless telecommunication network, wherein the request comes from an agent associated with the 5G wireless telecommunication network;

obtain the first role among the multiple roles, wherein the first role indicates that the agent is making the request, and wherein the permission indicates that the agent is not authorized to perform the requested operation on the data;

upon determining that the first role associated with the first user making the request is not permitted to perform the requested operation on the data, determine the second role among the multiple roles, wherein the second role is associated with the second user; and request authorization from the second user to enable the agent to perform the operation, thereby preventing a ransomware attack by an anonymous user attempting to take over an account associated with the first user.

4. The non-transitory, computer-readable storage medium of claim 1, comprising instructions to:

receive the request to access the data associated with the mobile device operating via the 5G wireless telecommunication network, wherein the request comes from an agent associated with the 5G wireless telecommunication network;

obtain the first role among the multiple roles, wherein the first role indicates that the agent is making the request, and wherein the permission indicates that the agent is authorized to perform the requested operation on the data;

determine whether the request is suspicious by:

determining a geographic location associated with the request;

obtaining a second received request associated with the mobile device;

determining a second geographic location associated with the second received request associated with the mobile device;

determining a time difference between a receipt of the request and a receipt of the second received request; and determining that the request is suspicious by determining that distance between the geographic location and the second geographic location cannot be traversed within the time difference; and even upon determining that the first role associated with the first user making the request is permitted to perform the requested operation on the data but upon determining that the request is suspicious, send a second request to a second mobile device associated with the first user making the request, wherein the second request asks the first user making the request to authorize the requested operation on the data.

5. The non-transitory, computer-readable storage medium of claim 1, comprising instructions to:

obtain, from the 5G wireless telecommunication network, an indication of a first multiplicity of mobile devices associated with the second user and operating via the 5G wireless telecommunication network;

obtain, from a second 5G wireless telecommunication network, an indication of a second mobile device associated with the second user operating via the second 5G wireless telecommunication network;

obtain, from an Internet service provider, an indication of a device associated with the second user and operating via the Internet service provider;

obtain, from the 5G wireless telecommunication network, a first indication of a first mobile device among the first multiplicity of mobile devices, wherein the first mobile device is currently active via the 5G wireless telecommunication network, and wherein the indication includes an identifier associated with the first mobile device or an indication that there are no devices currently active via the 5G wireless telecommunication network;

obtain, from the second 5G wireless telecommunication network, a second indication of a mobile device currently active via the second 5G wireless telecommunication network, wherein the indication includes an identifier associated with the mobile device currently active via the second 5G wireless telecommunication network or an indication that there are no devices currently active via the second 5G wireless telecommunication network;

obtain, from the Internet service provider, a third indication of a device currently active via the Internet service provider, wherein the indication includes an identifier associated with the mobile device currently active via the Internet service provider or an indication that there are no devices currently active via the Internet service provider; and request the authorization from the second user by sending a request for authorization to the first mobile device currently active via the 5G wireless telecommunication network, the mobile device currently active via the second 5G wireless telecommunication network, or the device currently active via the Internet service provider.

6. The non-transitory, computer-readable storage medium of claim 1, comprising instructions to:

upon receiving the authorization from the second user, receive a second request to access data associated with the mobile device operating via the 5G wireless telecommunication network, wherein the request includes the identifier associated with the first user making the request and the operation to be performed on the data;

determine whether the request is suspicious;

upon determining that the request is not suspicious, determine whether the second request is received within a predetermined amount of time from the request; and upon determining that the request is not suspicious and that the second request is received within the predetermined amount of time from the request, authorize the second request.

7. A method comprising:

obtaining a request to access data associated with a UE operating via a wireless telecommunication network, wherein the request includes an identifier associated with a first user making the request and a requested operation to be performed on the data;

obtaining a first role among multiple roles, and a permission associated with the first role, wherein the first role is associated with the first user making the request, and wherein the permission indicates an operation to be performed;

obtaining a type associated with the data associated with the request, wherein the type associated with the data includes sensitive data;

determining whether the type associated with the data is sensitive data;

upon determining that the type associated with the data is not sensitive data, providing the data to the UE;

upon determining that the type associated with the data is sensitive data, determining whether the first role associated with the first user making the request is permitted to perform the requested operation on the data;

upon determining that the first role associated with the first user making the request is permitted to perform the requested operation on the data, performing the requested operation on the data;

upon determining that the first role associated with the first user making the request is not permitted to perform the requested operation on the data, determining a second role among the multiple roles, wherein the second role is permitted to perform the requested operation on the data;

determining a second user associated with the second role;

requesting an authorization from the second user to allow the first user to perform the operation;

upon receiving the authorization from the second user, performing the requested operation on the data;

obtaining, from the wireless telecommunication network, an indication of a first multiplicity of UEs associated with the second user and operating via the wireless telecommunication network;

obtaining, from a second wireless telecommunication network, an indication of a second UE associated with the second user operating via a second wireless telecommunication network;

obtaining, from an Internet service provider, an indication of a UE associated with the second user and operating via the Internet service provider;

obtaining, from the wireless telecommunication network, a first indication of a first UE among the first multiplicity of UEs, wherein the first UE is currently active via the wireless telecommunication network, and wherein the indication includes an identifier associated with the first UE or an indication that there are no UEs currently active via the wireless telecommunication network;

obtaining, from the second wireless telecommunication network, a second indication of a UE currently active via the second wireless telecommunication network, wherein the indication includes an identifier associated with the UE currently active via the second wireless telecommunication network or an indication that there are no UEs currently active via the second wireless telecommunication network;

obtaining, from the Internet service provider, a third indication of a UE currently active via the Internet service provider, wherein the indication includes an identifier associated with the UE currently active via the Internet service provider or an indication that there are no UEs currently active via the Internet service provider; and requesting the authorization from the second user by sending a request for authorization to the first UE currently active via the wireless telecommunication network, the UE currently active via the second wireless telecommunication network, or the UE currently active via the Internet service provider.

8. The method of claim 7, comprising:

determining whether the request is suspicious by:

determining a geographic location associated with the request;

obtaining a second received request associated with the UE;

determining a second geographic location associated with the second received request associated with the UE;

determining a time difference between a receipt of the request and a receipt of the second received request; and determining that the request is suspicious by determining that distance between the geographic location and the second geographic location cannot be traversed within the time difference; and even upon determining that the first role associated with the first user making the request is permitted to perform the requested operation on the data but upon determining that the request is suspicious, sending a second request to a second UE associated with the first user making the request, wherein the second request asks the first user making the request to authorize the requested operation on the data.

9. The method of claim 7, comprising:

receiving the request to access the data associated with the UE operating via the wireless telecommunication network, wherein the request comes from an agent associated with the wireless telecommunication network;

obtaining the first role among the multiple roles, wherein the first role indicates that the agent is making the request, and wherein the permission indicates that the agent is not authorized to perform the requested operation on the data;

upon determining that the first role associated with the first user making the request is not permitted to perform the requested operation on the data, determining the second role among the multiple roles, wherein the second role is associated with the second user; and requesting authorization from the second user to enable the agent to perform the operation, thereby preventing a ransomware attack by an anonymous user.

10. The method of claim 7, comprising:

receiving the request to access the data associated with the UE operating via the wireless telecommunication network, wherein the request comes from an agent associated with the wireless telecommunication network;

obtaining the first role among multiple roles, wherein the first role indicates that the agent is making the request, and wherein the permission indicates that the agent is authorized to perform the requested operation on the data;

determining whether the request is suspicious by:

determining a geographic location associated with the request;

obtaining a second received request associated with the UE;

determining a second geographic location associated with the second received request associated with the UE;

determining a time difference between a receipt of the request and a receipt of the second received request; and determining that the request is suspicious by determining that distance between the geographic location and the second geographic location cannot be traversed within the time difference; and even upon determining that the first role associated with the first user making the request is permitted to perform the requested operation on the data but upon determining that the request is suspicious, sending a second request to a second UE associated with the first user making the request, wherein the second request asks the first user making the request to authorize the requested operation on the data.

11. The method of claim 7, comprising:

obtaining, from the wireless telecommunication network, an indication of a first multiplicity of UEs associated with the second user and operating via the wireless telecommunication network;

obtaining, from a second wireless telecommunication network, an indication of a second UE associated with the second user operating via the second wireless telecommunication network;

obtaining, from an Internet service provider, an indication of a UE associated with the second user and operating via the Internet service provider;

obtaining, from the wireless telecommunication network, a first indication of a first UE among the first multiplicity of UEs, wherein the first UE is currently active via the wireless telecommunication network, and wherein the indication includes an identifier associated with the first UE or an indication that there are no UEs currently active via the wireless telecommunication network;

obtaining, from the second wireless telecommunication network, a second indication of a UE currently active via the second wireless telecommunication network, wherein the indication includes an identifier associated with the UE currently active via the second wireless telecommunication network or an indication that there are no UEs currently active via the second wireless telecommunication network;

obtaining, from the Internet service provider, a third indication of a UE currently active via the Internet service provider, wherein the indication includes an identifier associated with the UE currently active via the Internet service provider or an indication that there are no UEs currently active via the Internet service provider;

based on the first indication, the second indication, and the third indication, determining whether there is a currently active UE;

upon determining that there is the currently active UE, requesting the authorization from the second user by sending a request for authorization to the first UE currently active via the wireless telecommunication network, the UE currently active via the second wireless telecommunication network, or the UE currently active via the Internet service provider; and upon determining that there is no currently active UE, sending the request for authorization to the first multiplicity of UEs, the second UE, and the UE.

12. A system comprising:

at least one hardware processor; and at least one non-transitory memory storing instructions, which, when executed by the at least one hardware processor, cause the system to:

obtain a request to access data associated with a UE operating via a wireless telecommunication network, wherein the request includes an identifier associated with a first user making the request and a requested operation to be performed on the data;

obtain a first role among multiple roles, and a permission associated with the first role, wherein the first role is associated with the first user making the request, and wherein the permission indicates an operation to be performed;

obtain a type associated with the data associated with the request, wherein the type associated with the data includes sensitive data;

determine whether the type associated with the data is sensitive data;

upon determining that the type associated with the data is not sensitive data, provide the data to the UE;

upon determining that the type associated with the data is sensitive data, determine whether the first role associated with the first user making the request is permitted to perform the requested operation on the data;

upon determining that the first role associated with the first user making the request is permitted to perform the requested operation on the data, perform the requested operation on the data;

upon determining that the first role associated with the first user making the request is not permitted to perform the requested operation on the data, determine a second role among the multiple roles, wherein the second role is permitted to perform the requested operation on the data;

determine a second user associated with the second role;

request an authorization from the second user to allow the first user to perform the operation;

upon receiving the authorization from the second user, perform the requested operation on the data;

obtain, from the wireless telecommunication network, an indication of a first multiplicity of UEs associated with the second user and operating via the wireless telecommunication network;

obtain, from a second wireless telecommunication network, an indication of a second UE associated with the second user operating via the second wireless telecommunication network;

obtain, from an Internet service provider, an indication of a UE associated with the second user and operating via the Internet service provider;

obtain, from the wireless telecommunication network, a first indication of a first UE among the first multiplicity of UEs, wherein the first UE is currently active via the wireless telecommunication network, and wherein the indication includes an identifier associated with the first UE or an indication that there are no UEs currently active via the wireless telecommunication network;

obtain, from the second wireless telecommunication network, a second indication of a UE currently active via the second wireless telecommunication network, wherein the indication includes an identifier associated with the UE currently active via the second wireless telecommunication network or an indication that there are no UEs currently active via the second wireless telecommunication network;

obtain, from the Internet service provider, a third indication of a UE currently active via the Internet service provider, wherein the indication includes an identifier associated with the UE currently active via the Internet service provider or an indication that there are no UEs currently active via the Internet service provider; and request the authorization from the second user by sending a request for authorization to the first UE currently active via the wireless telecommunication network, the UE currently active via the second wireless telecommunication network, or the UE currently active via the Internet service provider.

13. The system of claim 12, comprising instructions to:

determine whether the request is suspicious by:

determining a geographic location associated with the request;

obtaining a second received request associated with the UE;

determining a second geographic location associated with the second received request associated with the UE;

determining a time difference between a receipt of the request and a receipt of the second received request; and determining that the request is suspicious by determining that distance between the geographic location and the second geographic location cannot be traversed within the time difference; and even upon determining that the first role associated with the first user making the request is permitted to perform the requested operation on the data but upon determining that the request is suspicious, send a second request to a second UE associated with the first user making the request, wherein the second request asks the first user making the request to authorize the requested operation on the data.

14. The system of claim 12, comprising instructions to:

receive the request to access the data associated with the UE operating via the wireless telecommunication network, wherein the request comes from an agent associated with the wireless telecommunication network;

obtain the first role among the multiple roles, wherein the first role indicates that the agent is making the request, and wherein the permission indicates that the agent is not authorized to perform the requested operation on the data;

upon determining that the first role associated with the first user making the request is not permitted to perform the requested operation on the data, determine the second role among the multiple roles, wherein the second role is associated with the second user; and request authorization from the second user to enable the agent to perform the operation, thereby preventing a ransomware attack by an anonymous user.

15. The system of claim 12, comprising instructions to:

receive the request to access the data associated with the UE operating via the wireless telecommunication network, wherein the request comes from an agent associated with the wireless telecommunication network;

obtain the first role among multiple roles, wherein the first role indicates that the agent is making the request, and wherein the permission indicates that the agent is authorized to perform the requested operation on the data;

determine whether the request is suspicious by:

determining a geographic location associated with the request;

obtaining a second received request associated with the UE;

determining a second geographic location associated with the second received request associated with the UE;

determining a time difference between a receipt of the request and a receipt of the second received request; and determining that the request is suspicious by determining that distance between the geographic location and the second geographic location cannot be traversed within the time difference; and even upon determining that the first role associated with the first user making the request is permitted to perform the requested operation on the data but upon determining that the request is suspicious, send a second request to a second UE associated with the first user making the request, wherein the second request asks the first user making the request to authorize the requested operation on the data.

16. The system of claim 12, comprising instructions to:

obtain, from the wireless telecommunication network, an indication of a first multiplicity of UEs associated with the second user and operating via the wireless telecommunication network;

obtain, from a second wireless telecommunication network, an indication of a second UE associated with the second user operating via the second wireless telecommunication network;

obtain, from an Internet service provider, an indication of a UE associated with the second user and operating via the Internet service provider;

obtain, from the wireless telecommunication network, a first indication of a first UE among the first multiplicity of UEs, wherein the first UE is currently active via the wireless telecommunication network, and wherein the indication includes an identifier associated with the first UE or an indication that there are no UEs currently active via the wireless telecommunication network;

obtain, from the second wireless telecommunication network, a second indication of a UE currently active via the second wireless telecommunication network, wherein the indication includes an identifier associated with the UE currently active via the second wireless telecommunication network or an indication that there are no UEs currently active via the second wireless telecommunication network;

obtain, from the Internet service provider, a third indication of a UE currently active via the Internet service provider, wherein the indication includes an identifier associated with the UE currently active via the Internet service provider or an indication that there are no UEs currently active via the Internet service provider;

based on the first indication, the second indication, and the third indication, determine whether there is a currently active UE;

upon determining that there is the currently active UE, request the authorization from the second user by sending a request for authorization to the first UE currently active via the wireless telecommunication network, the UE currently active via the second wireless telecommunication network, or the UE currently active via the Internet service provider; and upon determining that there is no currently active UE, send the request for authorization to the first multiplicity of UEs, the second UE, and the UE.

17. The system of claim 12, comprising instructions to:

upon receiving the authorization from the second user, receive a second request to access data associated with the UE operating via the wireless telecommunication network, wherein the request includes the identifier associated with the first user making the request and the operation to be performed on the data;

determine whether the request is suspicious;

upon determining that the request is not suspicious, determine whether the second request is received within a predetermined amount of time from the request; and upon determining that the request is not suspicious and that the second request is received within the predetermined amount of time from the request, authorize the second request.

* * * * *